United States Patent
Bernard et al.

(10) Patent No.: US 9,123,126 B2
(45) Date of Patent: Sep. 1, 2015

(54) METHOD FOR ENHANCING LOCAL CONTRAST OF AN IMAGE

(71) Applicant: QUALCOMM Technologies, Inc., San Diego, CA (US)

(72) Inventors: Christophe Bernard, London (GB); Sarah Lannes, Orsay (FR)

(73) Assignee: QUALCOMM Technologies, Inc., San Diego, CA (US)

( * ) Notice: Subject to any disclaimer, the term of this patent is extended or adjusted under 35 U.S.C. 154(b) by 172 days.

(21) Appl. No.: 13/888,824

(22) Filed: May 7, 2013

(65) Prior Publication Data

US 2014/0334743 A1    Nov. 13, 2014

(51) Int. Cl.
G06K 9/40 (2006.01)
G06T 5/10 (2006.01)
G06T 5/00 (2006.01)

(52) U.S. Cl.
CPC . *G06T 5/10* (2013.01); *G06T 5/008* (2013.01); *G06T 2207/10024* (2013.01); *G06T 2207/20064* (2013.01)

(58) Field of Classification Search
None
See application file for complete search history.

(56) References Cited

U.S. PATENT DOCUMENTS

| 6,611,627 | B1* | 8/2003 | LaRossa et al. | 382/240 |
| 7,068,851 | B1* | 6/2006 | Berkner | 382/261 |
| 7,239,424 | B1* | 7/2007 | Berkner et al. | 358/2.1 |
| 8,059,905 | B1* | 11/2011 | Christian | 382/254 |
| 2001/0019335 | A1* | 9/2001 | Takeo | 345/670 |
| 2006/0210186 | A1* | 9/2006 | Berkner | 382/248 |
| 2008/0285853 | A1* | 11/2008 | Bressan | 382/169 |

OTHER PUBLICATIONS

Sakellaropoulos, P., L. Costaridou, and G. Panayiotakis. "A wavelet-based spatially adaptive method for mammographic contrast enhancement." Physics in Medicine and Biology 48.6 (2003): 787.*
Laine, Andrew, Jian Fan, and Wuhai Yang. "Wavelets for contrast enhancement of digital mammography." Engineering in Medicine and Biology Magazine, IEEE 14.5 (1995): 536-550.*
Scharcanski, Jacob, and Cláudio Rosito Jung. "An adaptive approach to mammographic image denoising and enhancement." Computer Graphics and Image Processing, 2004. Proceedings. 17th Brazilian Symposium on. IEEE, 2004.*
Poynton, Charles, "Digital Video and HDTV. Algorithms and Interfaces", Morgan Kaufmann Publishers; 2003; Parts 2-4, 434 pages.

* cited by examiner

*Primary Examiner* — Li Liu
(74) *Attorney, Agent, or Firm* — Knobbe, Martens, Olson & Bear LLP

(57) ABSTRACT

A method for enhancing local contrast of an image. The method comprises receiving a component of an image, computing a wavelets decomposition of the received component into wavelet coefficients, determining at least three subsets of wavelets coefficients based on a first threshold, a second threshold and computed wavelet coefficients, modifying the determined at least three subsets by applying at least a sharpening transformation on wavelet coefficients of at least one subset in said at least three subsets, recombining the at least three subsets into final wavelet coefficients, and reconstructing a new component based on the final wavelet coefficients.

12 Claims, 5 Drawing Sheets

METHOD FOR ENHANCING LOCAL CONTRAST OF AN IMAGE

BACKGROUND OF THE INVENTION

The present invention relates to the enhancement of the contrast of images and in particular of the local contrast.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. Furthermore, all embodiments are not necessarily intended to solve all or even any of the problems brought forward in this section.

Perceived sharpness in an image is one of the most important parameters that define quality of said image according to a subjective perception.

Considering wide acceptance of large screen TVs with up to 1920×1080 native panel resolutions as well as the fact that source signal in many cases is up-scaled from lower resolution source and therefore lacks details, the sharpness enhancement of TV images is an important feature for the user experience.

Some existing methods consist in normalizing the histogram of the image over a chosen dynamic.

Such a method/implementation has drawbacks.

This approach does not discriminate between low-contrast textures and high-contrast parts, but rather enhances or reduces contrast uniformly on all pixels lying in a given luminance range, which may not be offering the uncorrelated enhancing of local contrast to which the eye is particular sensitive to and global contrast which actually plays a minor part in our perception.

Thus, there is a need for preserving small details while enhancing local contrast of the images without flattening the whole image.

SUMMARY OF THE INVENTION

The invention relates to a method for enhancing local contrast of an image, wherein the method comprises:
receiving a component of an image;
computing a wavelets decomposition of the received component into wavelet coefficients;
determining at least three subsets of wavelets coefficients based on a first threshold, a second threshold and computed wavelet coefficients;
modifying the determined at least three subsets by applying at least a sharpening transformation on wavelet coefficients of at least one subset in said at least three subsets;
recombining the at least three subsets into final wavelet coefficients;
reconstructing a new component based on the final wavelet coefficients.

A component of an image may be, for instance:
a red, green, or blue components for a RGB color model;
a cyan, magenta, yellow and black components for a CMYK color model;
etc.

An image I[m,n] (with n and m the coordinate values in the image, e.g. the pixel coordinate values) may be transformed into a set of wavelets decomposition subbands $d_j^k[m,n]$, where j is a scale index, and k is an orientation index.

For typical wavelet transforms used for images, (and in particular for those described in Stéphane Mallat, "*Une Exploration des Signaux en Ondelettes*", Editions de l'Ecole Polytechnique, ISBN: 2-7302-0733-3 for 2D images), the orientation index k may range from 1 to 3 (e.g. vertical, horizontal and diagonal).

Each subband may have a varying size depending on a scale index j that ranges from 1 to some maximum value D (integer).

In addition to the wavelet coefficients, wavelet transforms may use low-pass coefficients denoted $a_j[m,n]$, where j can range from 1 to D. A classical reversible wavelet transform transforms an image I[m,n] into the following set of wavelet coefficients:

$d_j^k[m,n]$ for j=1 ... D, and k=1 ... 3.

$a_D[m,n]$

Typically, the one subset of the three subsets of wavelets coefficients comprises part of the wavelets coefficients $d_j^k[m,n]$ for small values of the coefficients, an other one comprises part of the wavelets coefficients $d_j^k[m,n]$ for medium values of the coefficients, an other one comprises part of the wavelets coefficients $d_j^k[m,n]$ for important values of the coefficients.

A sharpening transformation may be an increase of the value of the wavelets coefficients for a high frequency domain.

Other transformation may be used for instance, an amplification transformation (i.e. an increase or a multiplication of all values of the wavelets coefficients) or an attenuation transformation (i.e. a decrease or a division of all values of the wavelets coefficients).

In addition, the transformations may be a function of the scale j and/or of the orientation k of the wavelet coefficients.

In addition, determining the at least three subsets of wavelets coefficients may be a function of the absolute value of computed wavelet coefficients.

The received component may be a luminance component.

The first threshold may be a function of a noise threshold or a noise level of the image representing the amount of noise in the image.

In addition, the second threshold may be a function of a boundary between medium contrast and high contrast differences.

According to an embodiment, the computed wavelet coefficients may be noted $d_j^k[m,n]$ and $a_D[m,n]$, j being an integer ranging from 1 to an integer D, k being an orientation index, and n and m being coordinates in the image. The first threshold may be noted $T_n$.

One subset of the at least three subsets may comprise wavelets coefficients $$low_j^k[m,n] = \begin{cases} d_j^k[m,n] & \text{if } |d_j^k[m,n]| < D_1(T_n)[m,n] \\ 0 & \text{otherwise} \end{cases}.$$

$D_1(.)$ may be a distortion function. This distortion function may be in accordance with a previous distortion of the received luminance component in order to render such threshold consistent with the received component. The distortion may also be an identity transformation.

In addition, the computed wavelet coefficients may be noted $d_j^k[m,n]$ and $a_D[m,n]$, j being an integer ranging from 1 to an integer D, k being an orientation index, and n and m being coordinates in the image. The first threshold may be noted $T_n$.

The second threshold may be noted $T_h$.

One subset of the at least three subsets may comprise wavelets coefficients $$high_j^k[m,n] = \begin{cases} 0 & \text{if } |c_j^k[m,n]| \le D_2(T_h)[m,n] \\ \lambda(c_j^k[m,n] - D_2(T_h)[m,n]) & \text{if } D_2(T_h)[m,n] < |c_j^k[m,n]| \le \frac{\lambda}{\lambda-1}*D_2(T_h)[m,n] \\ c_j^k[m,n] & \text{if } |c_j^k[m,n]| > \frac{\lambda}{\lambda-1}*D_2(T_h)[m,n] \end{cases}$$

$D_2(.)$ may be a distortion function. $D_1$ may be equal to $D_2$. This distortion function may be in accordance with a previous distortion of the received luminance component in order to render such threshold consistent with the received component. The distortion may also be an identity transformation.

Slope $\lambda$ may be a real number and may be adaptable.

$c_j^k[m,n]$ may be a coefficient between 0 and $d_j^k[m,n]$ (included).

In another embodiment, $c_j^k[m,n]$ may be a function of $d_j^k[m,n]-low_j^k[m,n]$. In one case, $c_j^k[m,n]=d_j^k[m,n]-low_j^k[m,n]$.

In addition, the at least three subsets may comprise wavelets coefficients $low_j^k[m,n]$, $med_j^k[m,n]$, and $high_j^k[m,n]$, with $d_j^k[m,n]$ is equal to $low_j^k[m,n]+med_j^k[m,n]+high_j^k[m,n]$.

Recombining may comprise adding wavelet coefficients of the at least three subsets for same coordinates in the image.

Yet another aspect of the invention relates to a device for enhancing local contrast of an image, wherein the device comprises:
an interface for receiving a component of an image;
a circuit for computing a wavelets decomposition of the received component into wavelet coefficients;
a circuit for determining at least three subsets of wavelets coefficients based on a first threshold, a second threshold and computed wavelet coefficients;
a circuit for modifying the determined at least three subsets by applying at least a sharpening transformation on wavelet coefficients of at least one subset in said at least three subsets;
a circuit for recombining the at least three subsets into final wavelet coefficients ($d_j^k[m,n]$, $a_D[m,n]$);
a circuit for reconstructing a new component based on the final wavelet coefficients.

A third aspect relates to a computer program product comprising a computer readable medium, having thereon a computer program comprising program instructions. The computer program is loadable into a data-processing unit and adapted to cause the data-processing unit to carry out the method described above when the computer program is run by the data-processing unit.

Other features and advantages of the method and apparatus disclosed herein will become apparent from the following description of non-limiting embodiments, with reference to the appended drawings.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
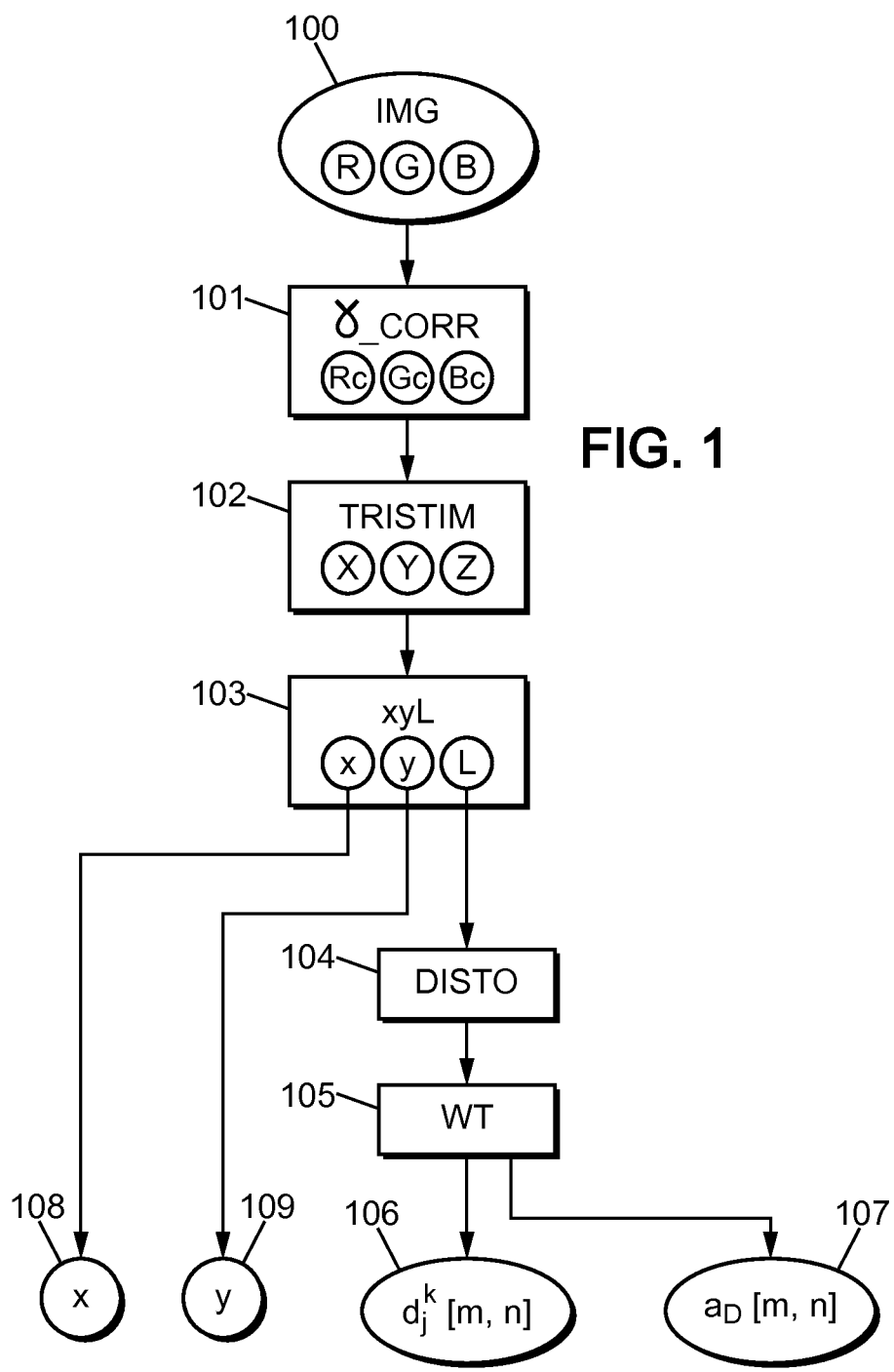
FIG. 1 is a flow chart describing a possible embodiment of the present invention and illustrates a sequence of processing steps for transforming color components of an image into wavelet coefficients.

FIG. 1 is a flow chart describing a possible embodiment of the present invention and illustrates a sequence of processing steps for transforming color components of an image into wavelet coefficients.

When receiving an image 100 comprising for instance three color components (i.e. R for red, G for green and B for blue), the color are "corrected" according a gamma correction (step 101).

Three new color components $R_c$, $G_c$, $B_c$ are obtained after the gamma correction:

$$\begin{cases} R_c = R^\gamma \\ G_c = R^\gamma \\ R_c = R^\gamma \end{cases}$$

These components are then converted (step 102) to the tri-stimulus space XYZ (e.g. CIE 1931 color space) described in Charles Poynton, « *Digital Video and HDTV. Algorithms and Interfaces.* », Morgan Kaufmann Publishers and *IEC 61966-2-4:2066, Multimedia systems and equipment—Colour measurement and management—Part 2-4: Colour management—Extended-gamut YCC colour space for video applications—xvYCC* which are thereby included by reference.

Tristimulus system is a standard chromaticity diagram for visually matching a color under standardized conditions against the three primary colors (i.e. red, green, and blue).

These three components are expressed as X, Y, and Z, respectively, and are called tristimulus values. In this model, Y represents the luminance and Z is quasi-equal to blue stimulation, or the S cone response, while X is a mix (a linear combination) of cone response curves chosen to be nonnegative.

The XYZ color components are then transformed (step 103) to a new space color xyL described in Charles Poynton, « *Digital Video and HDTV. Algorithms and Interfaces.* », Morgan Kaufmann Publishers.

The components x and y are computed according the following formula:

$$x = \frac{X}{X+Y+Z} \text{ and } y = \frac{Y}{X+Y+Z}.$$

It is noted also that $$z = \frac{Z}{X+Y+Z} = 1 - x - y.$$

It is then possible to define a new color space xyY. This is a actual complete color space as the previous components X, Y and Z may be derived from x, y, and Y. Indeed, $$X = \frac{Y}{y}x \text{ and } Z = \frac{Y}{y}(1 - x - y).$$

It is also possible to define a new color space xyL with L a weighted combination of X, Y and Z (i.e. a slight twist of Y). In one case, L may simply be equal to Y.

Any other space color transformation is also possible if the luminance of the image is essentially represented by the L component (e.g. color space $YC_bC_r$ with L=Y).

Then, L is transformed (step 104) using a distortion function f: L(p) value of each pixel p is replaced with f(L(p)).

This distortion may be a logarithm distortion. Indeed, it may be more natural, when handling contrast, to work in the logarithmic space rather then the linear space as the contrast of two pixels p1 and p2 is defined by its ratio p1/p2.

Therefore, after a future wavelet transformation, subbands $d_j^k[m,n]$ may represent local differences in the image, for scale j=1, $d_j^k[m,n]$ may be log(p1)−log(p2) which is equal to log(p1/p2), hence expressing contrast directly.

Moreover, the distorted luminance f(L) is not clipped and have an infinite support ]−∞;+∞[. In practice the function may not map to an infinite range, but may offer to some extent the benefits of this particular distortion function.

The distorted component f(L) goes through a wavelet transform WT (step 105) to compute low-pass coefficients 107 $a_D[m,n]$ and high-pass coefficients 106 $d_{jk}[m,n]$ for k=1 . . . 3 and j=1 . . . D with the notation mentioned above.

The components 108 x and 109 y may be retrieved from step 103.

Figure 2:
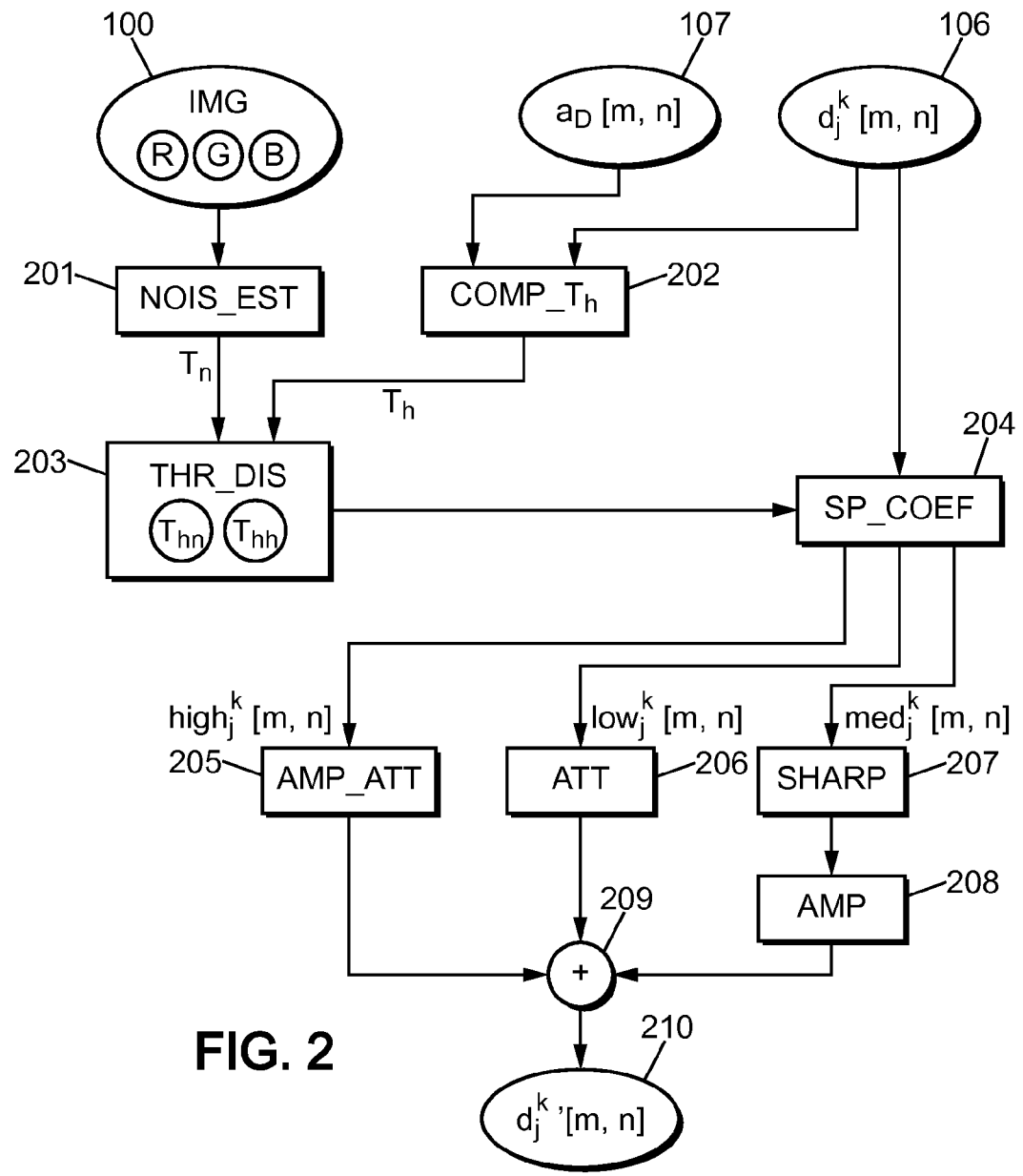
FIG. 2 is a flow chart describing a possible embodiment of the present invention and illustrates a sequence of processing steps for modifying wavelet coefficients according to the present invention.

FIG. 2 is a flow chart describing a possible embodiment of the present invention and illustrates a sequence of processing steps for modifying wavelet coefficients according to the present invention.

Upon receiving an image 100, it is possible to compute (step 201) a noise threshold $T_n$: this noise threshold $T_n$ may represent the amount of noise present in the image. A plurality of techniques may be used to compute such threshold.

A second threshold $T_h$ may be computed (step 202) in order to represent the boundary between "medium" contrast differences and "high" contrast differences. These differences are computed on wavelets coefficients (based on the distorted luminance values, see FIG. 1). High contrast differences are often so large that the eye response for them is saturated, and there is no need enhance them. Medium contrast differences may be more significant than noise, and the eye is sufficiently sensitive to these contrasts that it may be valuable to enhance them.

Both thresholds $T_n$ and $T_h$ may be meaningful for handling differences on R, G or B values. In order to turn them into meaningful threshold for distorted luminance values, they may be amplified depending on the underlying image brightness. The thresholds is said to be locally "distorted" (step 203) in accordance with the distortion of the luminance values. The result is then $T_{hn}[m,n]$ and $T_{hh}[m,n]$ (defined as functions of the image position n and m).

The noise threshold $T_n[m,n]$ is originally a single value estimated for the whole image in the perceptually-uniform domain following, for instance, the classic median wavelet estimation and is then distorted for each pixel depending on the mean value $a_D[m,n]$. But after gamma and distortion, $T_n[m,n]$ is transformed into $T_{hn}[m,n]$ to become a function of the original pixel value.

Likewise, the threshold $T_{hh}[m,n]$ may be a distortion of the global parameter $T_h[m,n]$ suited to the logarithmic space.

Once the wavelets coefficient $d_j^k[m,n]$ computed, it may be possible to separate (step 204) these coefficients $d_j^k[m,n]$ into noise coefficients $low_j^k[m,n]$, medium coefficients $med_j^k[m,n]$ and big coefficients $high_j^k[m,n]$ so that $d_j^k[m,n] = low_j^k[m,n] + med_j^k[m,n] + high_j^k[m,n]$.

The meaning of these new coefficients is:

low is for noise coefficients which are representing variations that are unwise to amplify;
med is for low-contrast textures;
high is for high-contrast textures.

This separation process (step 204) may be useful for either amplify the low-contrast part while leaving the high contrast part untouched for local contrast enhancement or conversely attenuate the high contrast part while preserving small details in not touching the low-contrast part for high-dynamic reduction for example. Other combinations are of course possible, as well as the attenuation of the low coefficients which is virtually free noise reduction at this point.

The low coefficients may be separated using a hard thresholding method. For instance:

$$low_j^k[m,n] = \begin{cases} d_j^k[m,n] & \text{if } |d_j^k[m,n]| < T_{hn}[m,n] \\ 0 & \text{otherwise} \end{cases}$$

The remaining coefficients $c_j^k[m,n] = d_j^k[m,n] - low_j^k[m,n]$ are then split using a thresholding scheme which is an intermediate between soft and hard thresholding, which can be described as follow:

$$high_j^k[m,n] = \begin{cases} 0 & \text{if } |c_j^k[m,n]| \le T_{hh}[m,n] \\ \lambda(c_j^k[m,n] - T_{hh}[m,n]) & \text{if } T_h[m,n] < |c_j^k[m,n]| \le \frac{\lambda}{\lambda - 1} * T_{hh}[m,n] \\ c_j^k[m,n] & \text{if } |c_j^k[m,n]| > \frac{\lambda}{\lambda - 1} * T_{hh}[m,n] \end{cases}$$

Slope λ is adjustable.

Figure 3:
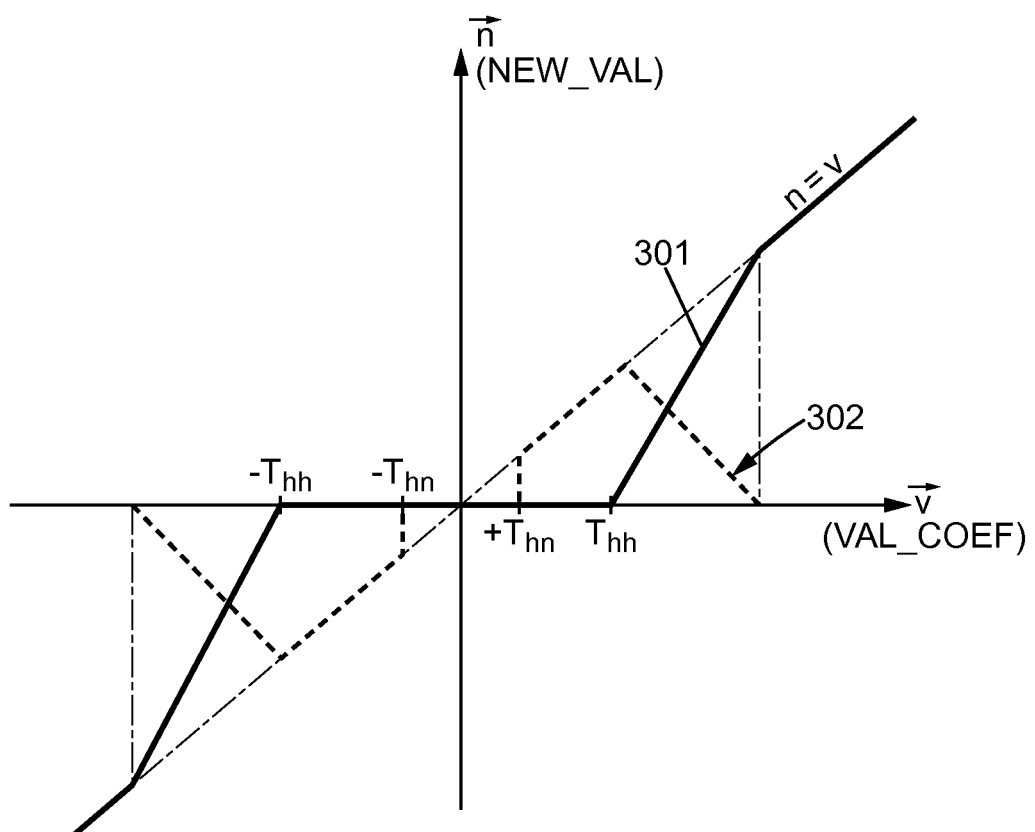
FIG. 3 is a graph representing a thresholding method for wavelet coefficients.

Such thresholding for the big coefficients may be represented by the graph on FIG. 3, element 301.

Coefficients $med_j^k[m,n]$ are then the subtracted residue. Such thresholding for the median coefficients may be represented by the graph on FIG. 3, element 302.

It may be possible to attenuate small coefficients (step 206), although they can be left untouched (this attenuation can differ for every scale).

It is also possible to add some sharpening (step 207) on medium coefficients (i.e. amplification of the medium coefficients of fine scale)

Medium coefficients can be amplified (step 208) or left untouched, with an amplification factor depending on the scale.

Likewise, big coefficients can be amplified (step 205) or attenuated on a scale-by-scale basis.

Finally, the modified (sharpened, attenuated, amplified, etc.) coefficients may be reassembled into a new set of coefficients 210 $d_j^{k'}[m,n]$.

Figure 4:
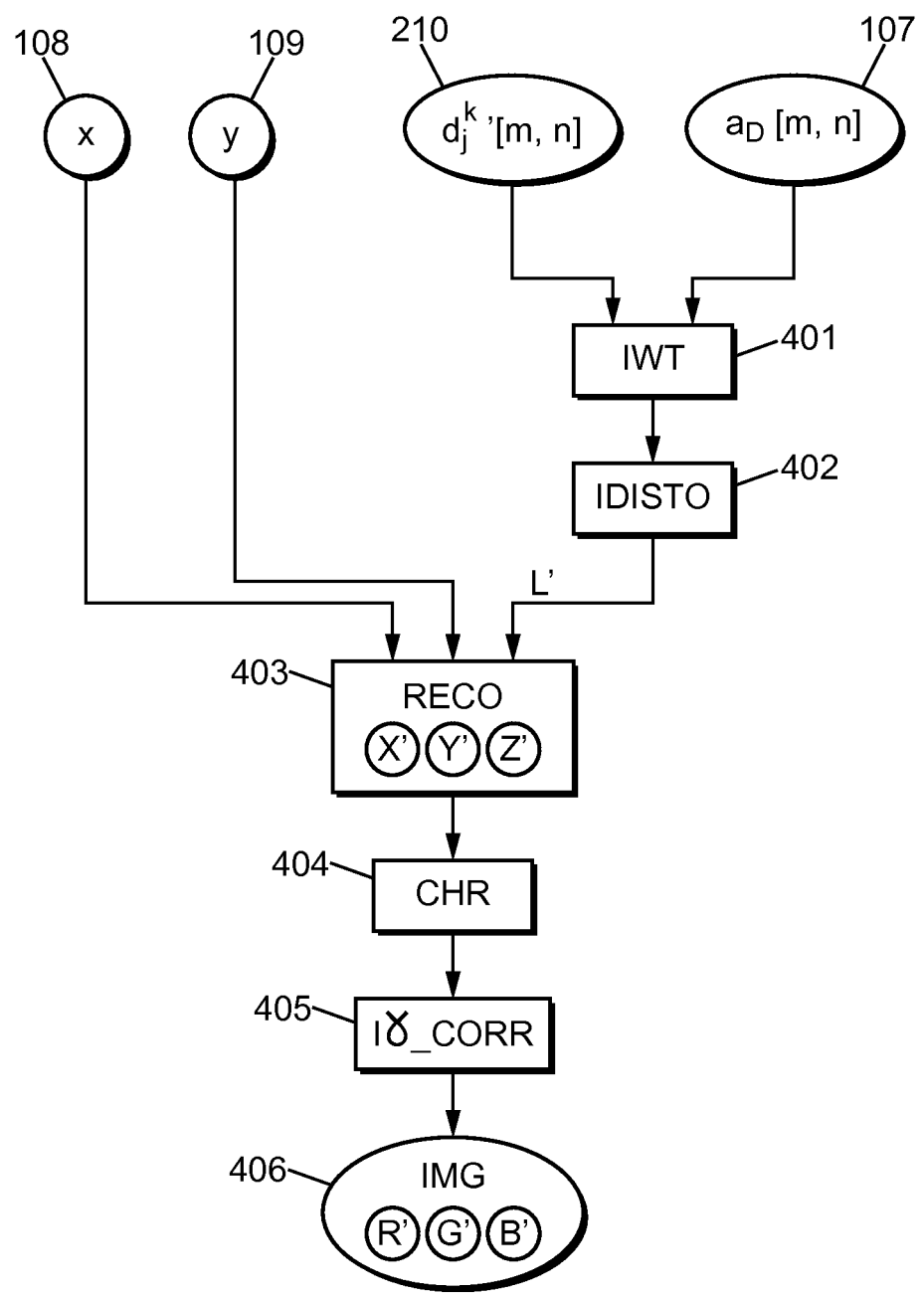
FIG. 4 is a flow chart describing a possible embodiment of the present invention and illustrates a sequence of processing steps for transforming wavelet coefficients into color components of an image.

FIG. 4 is a flow chart describing a possible embodiment of the present invention and illustrates a sequence of processing steps for transforming wavelet coefficients into color components of an image.

Indeed, upon the reception of wavelets components 210 and 107 (i.e. $d_j^{k'}[m,n]$ and $a_D[m,n]$) it is possible to reconstruct a distorted luminance component an image through an inverse wavelet transform (step 401). This step is an inverse wavelets transformation, i.e. the inverse of step 105.

It is then possible to inverse the distortion performed in step 104 to compute a new luminance component L' (step 402).

With the component 108 x, the component 109 y and the new component L', it is possible to compute new components X', Y' and Z' as described in relation with FIG. 1. This operation is the inverse of step 102.

Then, three color components $R_c'$, $G_c'$, $B_c'$ (red, green and blue components) may be derived from these X', Y' and Z' components (step 404). This step is the inverse of step 102.

These color components are gamma corrected and thus, it is possible to remove this correction in order to retrieve the actual RGB components (step 405). This step is the inverse of step 101.

As a result, a new image 406 may be outputted with new color components and a better local contrast while preserving small details.

Part of the flow chart of FIGS. 1, 2 and 4 can represent steps of an example of a computer program which may be executed by the an electronic device, a circuit or a computer device.

Figure 5:
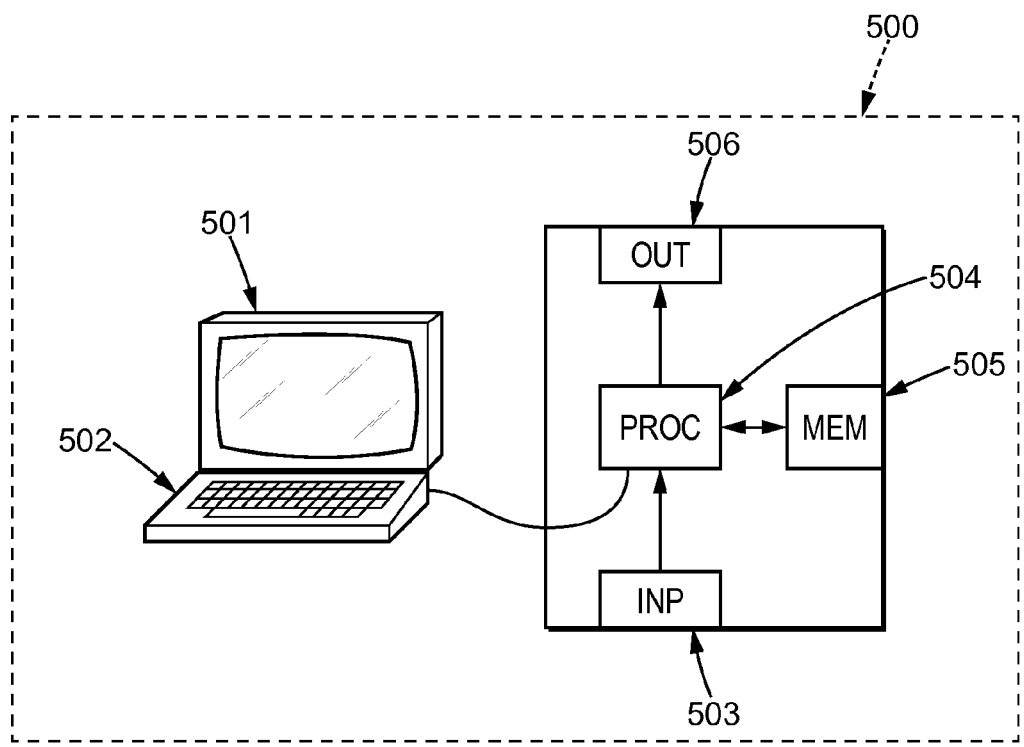
FIG. 5 is a block diagram of a device that may be used to implement embodiments of the present invention.

FIG. 5 is a possible embodiment for a device that enables the present invention.

In this embodiment, the device 500 comprise a computer, this computer comprising a memory 505 to store program instructions loadable into a circuit and adapted to cause circuit 504 to carry out the steps of the present invention when the program instructions are run by the circuit 504.

The memory 505 may also store data and useful information for carrying the steps of the present invention as described above.

The circuit 504 may be for instance:
- a processor or a processing unit adapted to interpret instructions in a computer language, the processor or the processing unit may comprise, may be associated with or be attached to a memory comprising the instructions, or
- the association of a processor/processing unit and a memory, the processor or the processing unit adapted to interpret instructions in a computer language, the memory comprising said instructions, or
- an electronic card wherein the steps of the invention are described within silicon, or
- a programmable electronic chip such as a FPGA chip (for « Field-Programmable Gate Array» ).

This computer comprises an input interface 503 for the reception of images and an output interface 506 for providing modified image.

To ease the interaction with the computer, a screen 501 and a keyboard 502 may be provided and connected to the computer circuit 604.

A person skilled in the art will readily appreciate that various parameters disclosed in the description may be modified and that various embodiments disclosed may be combined without departing from the scope of the invention.

For instance, the description indicates that the image are coded according an RGB color model but any other coding may be used such as $YC_rC_b$, or any other color model.

What is claimed is:

1. A method for enhancing local contrast of an image, wherein the method comprises:
   receiving a component of the image;
   computing wavelet coefficients based on a wavelet decomposition of the received component;
   computing a first threshold and a second threshold based on a brightness of the image;
   determining at least three subsets of wavelet coefficients based on the first threshold, the second threshold and the computed wavelet coefficients;
   modifying the at least three subsets via applying a sharpening transformation on at least one of the at least three subsets;
   recombining the at least three subsets into final wavelet coefficients; and
   reconstructing a new component based on the final wavelet coefficients.

2. A method according to claim 1, wherein determining the at least three subsets of wavelet coefficients is a function of the absolute value of the computed wavelet coefficients.

3. A method according to claim 1, wherein the received component is a luminance component.

4. A method according to claim 1, wherein the first threshold is a function of a noise threshold of the image representing the amount of noise in the image.

5. A method according to claim 1, wherein the second threshold is a function of a boundary between medium contrast and high contrast differences.

6. A method according to claim 1, wherein the computed wavelet coefficients are $d_j^k[m,n]$ and $a_D[m,n]$, j being an integer ranging from 1 to an integer D, k being an orientation index, and n and m being coordinates in the image, wherein the first threshold is $T_n$, wherein one subset of the at least three subsets comprise wavelet coefficients $low_j^k[m,n]$, wherein $$low_j^k[m,n] = \begin{cases} d_j^k[m,n] & \text{if } |d_j^k[m,n]| < D_1(T_n)[m,n] \\ 0 & \text{otherwise} \end{cases},$$

and wherein $D_1(.)$ is a distortion function.

7. A method according to claim 1, wherein the computed wavelet coefficients are $d_j^k[m,n]$ and $a_D[m,n]$, j being an integer ranging from 1 to an integer D, k being an orientation index, and n and m being coordinates in the image, wherein the first threshold is $T_n$, wherein the second threshold is $T_h$, wherein one subset of the at least three subsets comprise wavelet coefficients $high_j^k[m,n]$, wherein $$high_j^k[m,n] = \begin{cases} 0 & \text{if } |c_j^k[m,n]| \leq D_2(T_h)[m,n] \\ \lambda(c_j^k[m,n] - D_2(T_h)[m,n]) & \text{if } D_2(T_h)[m,n] < |c_j^k[m,n]| \leq \frac{\lambda}{\lambda-1} * D_2(T_h)[m,n] \\ c_j^k[m,n] & \text{if } |c_j^k[m,n]| > \frac{\lambda}{\lambda-1} * D_2(T_h)[m,n] \end{cases}$$

wherein $D_2(.)$ is a distortion function,
wherein $\lambda$ is a real number, and wherein $c_j^k[m,n]$ is a coefficient between 0 and $d_j^k[m,n]$.

8. A method according to claim 1, wherein the computed wavelet coefficients are $d_j^k[m,n]$ and $a_D[m,n]$, j being an integer ranging from 1 to an integer D, k being an orientation index, and n and m being coordinates in the image, wherein the first threshold is $T_n$, wherein one subset of the at least three subsets comprise wavelet coefficients $low_j^k[m,n]$, wherein $$low_j^k[m,n] = \begin{cases} d_j^k[m,n] & \text{if } |d_j^k[m,n]| < D_1(T_n)[m,n] \\ 0 & \text{otherwise} \end{cases},$$

wherein $D_1(.)$ is a distortion function,
wherein the second threshold is $T_h$,
wherein one subset of the at least three subsets comprise wavelet coefficients $high_j^k[m,n]$,
wherein $$high_j^k[m,n] = \begin{cases} 0 & \text{if } |c_j^k[m,n]| \leq D_2(T_h)[m,n] \\ \lambda(c_j^k[m,n] - D_2(T_h)[m,n]) & \text{if } D_2(T_h)[m,n] < |c_j^k[m,n]| \leq \frac{\lambda}{\lambda-1} * D_2(T_h)[m,n] \\ c_j^k[m,n] & \text{if } |c_j^k[m,n]| > \frac{\lambda}{\lambda-1} * D_2(T_h)[m,n] \end{cases}$$

wherein $D_2(.)$ is a distortion function,
wherein $\lambda$ is a real number,
and wherein $c_j^k[m,n]$ is a coefficient between 0 $d_j^k[m,n]$.

9. A method according to claim 1, wherein the computed wavelet coefficients are $d_j^k[m,n]$ and $a_D[m,n]$, j being an integer ranging from 1 to an integer D, k being an orientation index, and n and m being coordinates in the image, wherein the at least three subsets comprise wavelet coefficients $_j^k[m,n]$, $med_j^k[m,n]$, and $high_j^k[m,n]$, and wherein $d_j^k[m,n]=low_j^k[m,n]+med_j^k[m,n]+high_j^k[m,n]$.

10. A method according to claim 1, wherein recombining the at least three subsets further comprises adding wavelet coefficients of the at least three subsets for the same coordinates in the image.

11. A device for enhancing local contrast of an image, wherein the device comprises:

an interface configured to receive a component of the image;
a circuit configured to compute wavelet coefficients based on a wavelet decomposition of the received component;
a circuit configured to compute a first threshold and a second threshold based on a brightness of the image;
a circuit configured to determine at least three subsets of wavelet coefficients based on the first threshold, the second threshold and the computed wavelet coefficients;
a circuit configured to modify the at least three subsets via applying a sharpening transformation on at least one of the at least three subsets;
a circuit configured to recombine the at least three subsets into final wavelet coefficients; and
a circuit configured to reconstruct a new component based on the final wavelet coefficients.

12. A non-transitory computer readable storage medium having stored thereon instructions that, when executed, cause a processor of a device to:
receive a component of an image;
compute wavelet coefficients based on a wavelet decomposition of the received component;
compute a first threshold and a second threshold based on a brightness of the image;
determine at least three subsets of wavelet coefficients based on the first threshold, the second threshold and the computed wavelet coefficients;
modify the at least three subsets via applying a sharpening transformation on at least one of the at least three subsets;
recombine the at least three subsets into final wavelet coefficients; and
reconstruct a new component based on the final wavelet coefficients.

* * * * *